(12) United States Patent
Adomeit et al.

(10) Patent No.: US 6,227,568 B1
(45) Date of Patent: *May 8, 2001

(54) AIR BAG MODULE

(75) Inventors: Heinz-Dieter Adomeit; Eleonore Braun, both of Berlin; Thomas Marotzke, Bergfelde, all of (DE)

(73) Assignee: Petri AG, Aschaffenburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,078

(22) PCT Filed: May 10, 1996

(86) PCT No.: PCT/DE96/00871

§ 371 Date: Nov. 25, 1997

§ 102(e) Date: Nov. 25, 1997

(87) PCT Pub. No.: WO96/38324

PCT Pub. Date: Dec. 5, 1996

(30) Foreign Application Priority Data

May 29, 1995 (DE) .............................. 195 19 998

(51) Int. Cl.[7] .................................................. B60R 21/22
(52) U.S. Cl. .................................. 280/743.1; 280/730.1; 280/732
(58) Field of Search ........................... 280/743.1, 728.1, 280/730.1, 732, 731

(56) References Cited

U.S. PATENT DOCUMENTS

| 3,897,961 | * | 8/1975 | Leising et al. | 280/730.1 |
|---|---|---|---|---|
| 5,213,361 | * | 5/1993 | Satoh et al. | 280/730.1 |
| 5,253,892 | * | 10/1993 | Satoh | 280/731 |
| 5,310,216 | | 5/1994 | Wehner et al. | 280/743 |
| 5,324,070 | * | 6/1994 | Kitagawa et al. | 280/730.1 |
| 5,360,231 | | 11/1994 | Adams | 280/728 |
| 5,454,588 | * | 10/1995 | Rose | 280/728.3 |
| 5,505,489 | * | 4/1996 | Bollaert et al. | 280/743.1 |
| 5,513,877 | * | 5/1996 | Mac Brien et al. | 280/732 |
| 5,533,748 | * | 7/1996 | Wirt et al. | 280/728.3 |
| 5,613,708 | * | 3/1997 | Bleider et al. | 280/743.2 |

FOREIGN PATENT DOCUMENTS

| 2109637 | 9/1972 | (DE) . |
|---|---|---|
| 0590845 | 4/1994 | (EP) . |
| 2283464 | 5/1995 | (GB) . |
| 5092746 | 4/1993 | (JP) . |

* cited by examiner

Primary Examiner—J. J. Swann
Assistant Examiner—David R. Dunn
(74) Attorney, Agent, or Firm—Christie, Parker & Hale, LLP

(57) ABSTRACT

An airbag module for use in a motor vehicle includes a gas generator, and an airbag operatively connected to the gas generator which has, in an inflated state, a restricted cross-section with substantially parallel sides and two opposite ends, and two enlarged sections, each adjoining a different one of the two opposite ends of the restricted cross-section such that the airbag is bone-shaped. One of the enlarged sections of the airbag is adapted to face an occupant of the motor vehicle in which it is installed. Preferably, the airbag is mounted either underneath, above, or in the middle of the dashboard of the motor vehicle. The airbag may be installed in the steering wheel or a side airbag position in the motor vehicle.

15 Claims, 5 Drawing Sheets

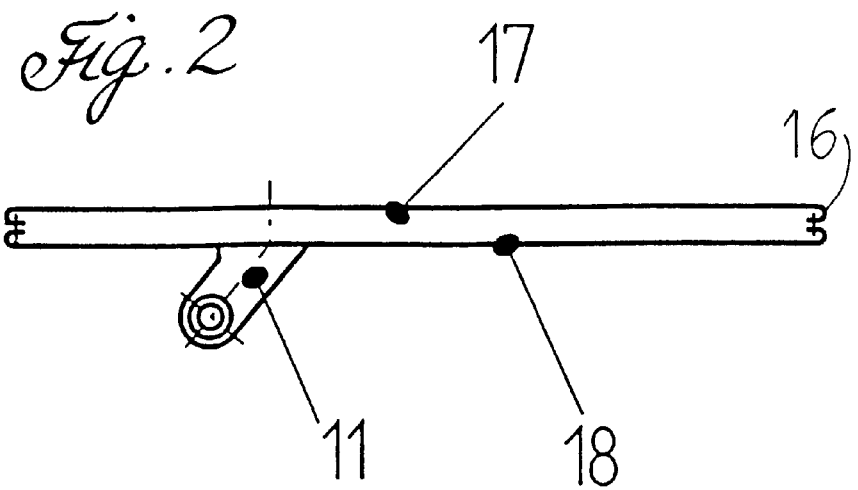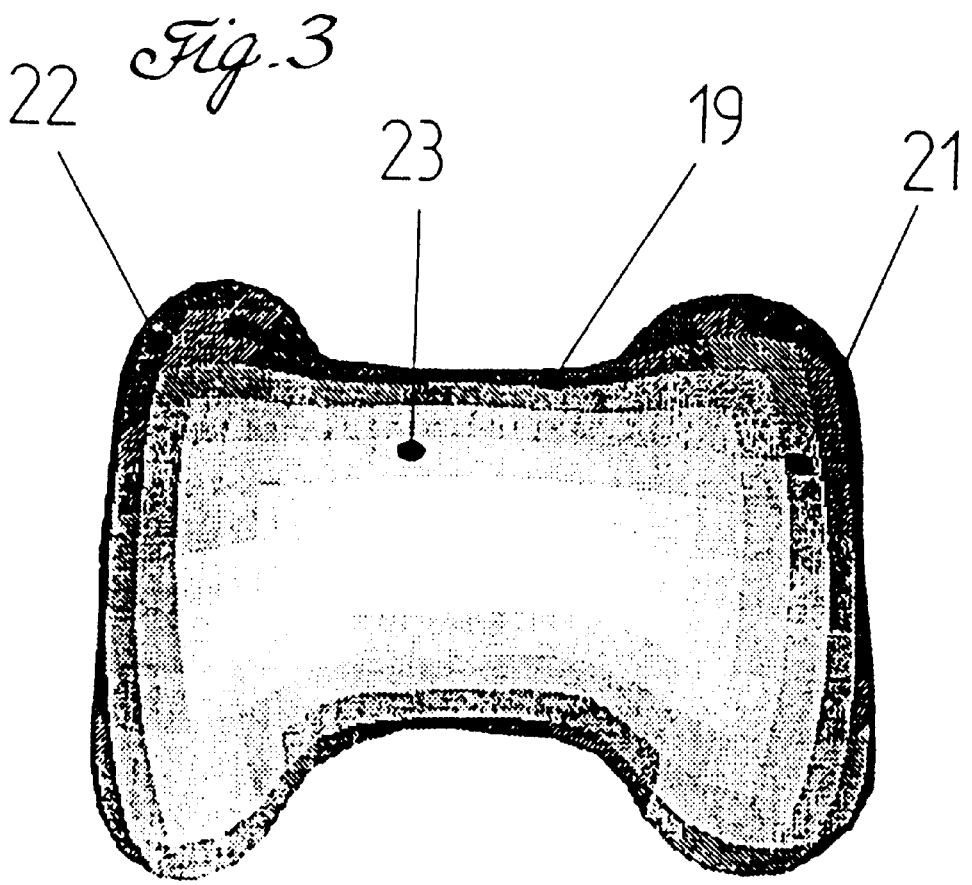

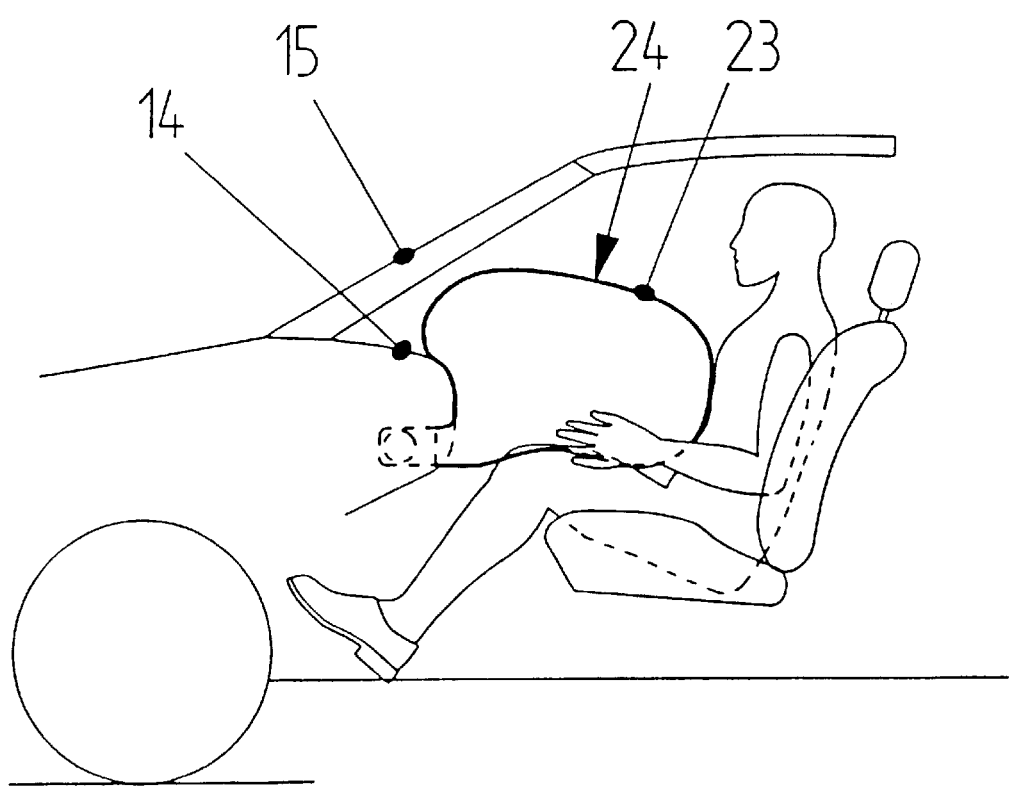

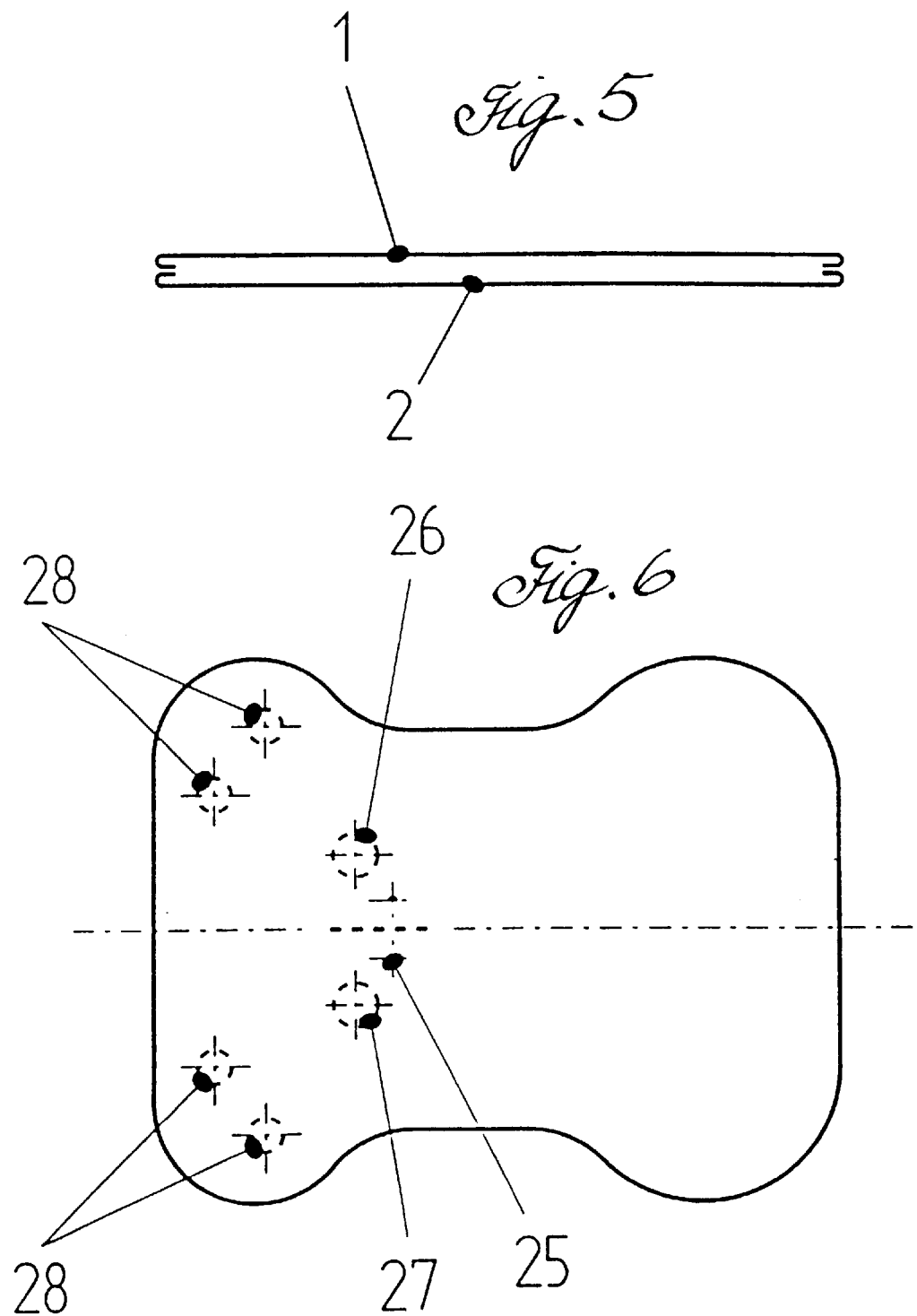

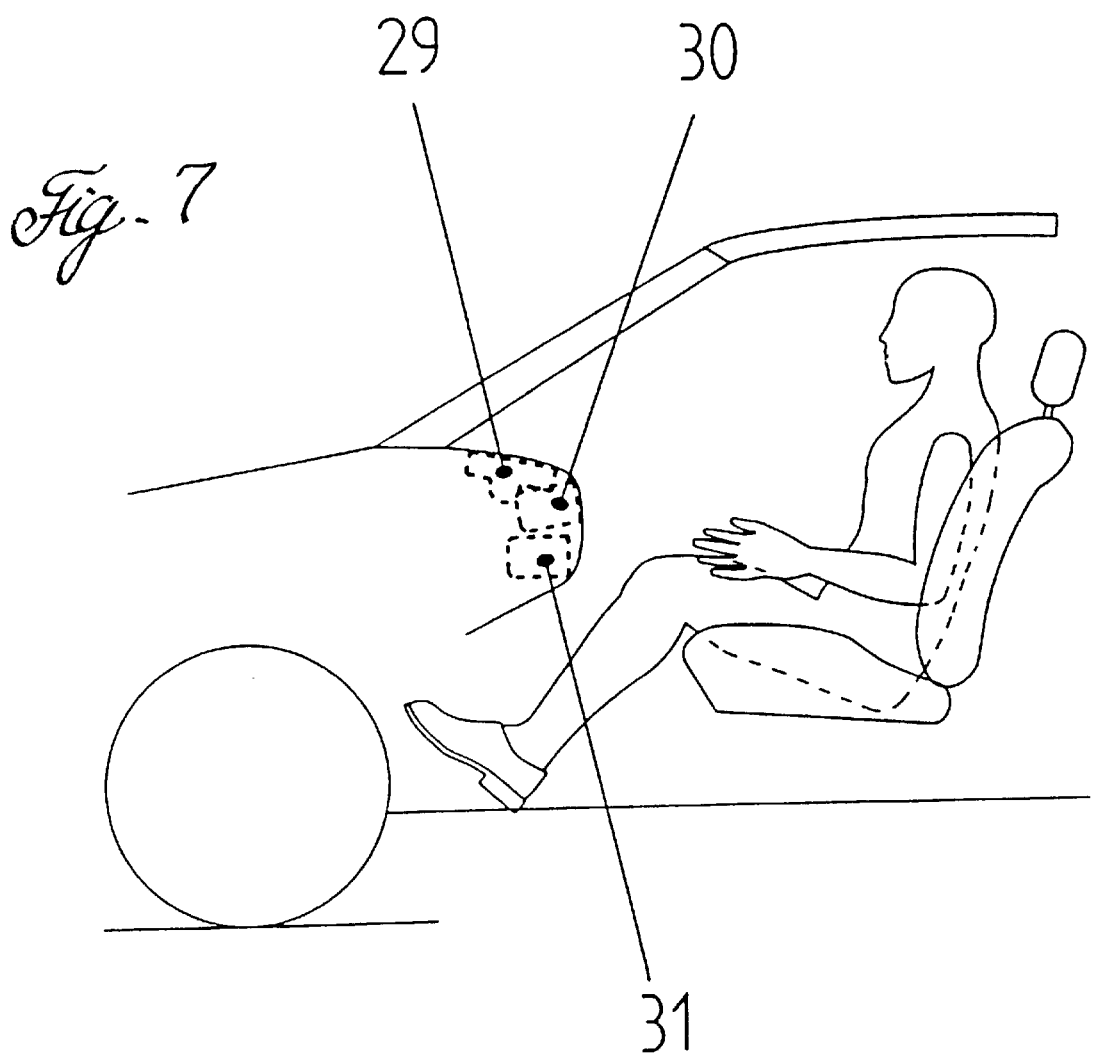

AIR BAG MODULE

BACKGROUND

The invention relates to an airbag module.

The airbags used in known airbag modules have in the non-inflated state a circular, round, elliptical or similar shape. Passenger airbags use airbags which are generally three-dimensional structures comprised of several parts joined together. They are arranged so that in the fully inflated state they fill out the space between the dashboard and the occupant. During inflation, more particularly before reaching the final shape, these airbags have a substantially spherical shape. These known airbags expand in the event of a crash extensively both in the direction of the occupant and upwards so that a sufficiently large protective cushion is provided for the occupant.

The known airbags have, however, the disadvantage that they have, as a result of the even expansion in the inflated state, areas which are not necessary for the protection of the driver but which have to be inflated as well as those areas necessarily inflated for the protection of the driver in order to ensure the protective function of the airbag as a whole.

Furthermore there is the disadvantage that the airbag, more particularly in the case of an module for the passenger, cannot be effectively inflated and unfolded without additional measures. Moreover the windscreen has to undertake important support and directing functions during inflation of the airbag. The windscreen cannot however fulfil these functions if it is destroyed, for example in the case of a secondary impact.

In order to overcome this disadvantage, it is already known to arrange arrester straps in the airbag which define the expansion of the airbag in the direction of the windscreen. Arrester straps are however additional parts which increases the costs of the airbag.

From JP-A- 092746 (Patent Abstract) an airbag is known for a passenger seat which has a cross-section which is restricted in the middle. Airbag material is thereby saved. The drawback with this airbag is that it is supported on the front windscreen of the motor vehicle. This supporting function can however no longer be fulfilled if the windscreen is destroyed. A further disadvantage is that the restricted cross-section is located at a point where the force introduction through the moving occupant at impact is greatest, therefore this airbag provides only a restricted restraint action.

Furthermore from EP A 0 590 845 a side airbag is known which has a restriction in the area of the inflation mouth of the airbag. It is thereby divided into a lower and an upper area which are adapted in size to the provisions of the door. The restriction serves to supply the gas to the lower and upper areas and has no protective function. Since the lower and upper areas are inflated suddenly from area of the restriction, the seams and fabric are heavily stressed.

SUMMARY

According to an embodiment of the invention, it is possible to design and arrange an airbag so that large supporting faces are only provided where they are required for the occupant to impact and so that the airbag can unfold in a predetermined direction.

According to one embodiment of the invention, an airbag module for use in a motor vehicle is provided which includes a gas generator, and an airbag operatively connected to the gas generator, which has, in an inflated state, a restricted cross-section with substantially parallel sides and two opposite ends, and two enlarged sections, each adjoining a different one of the two opposite ends of the restricted cross-section such that the airbag is bone-shaped. One of the enlarged sections of the airbag is adapted to face an occupant of the motor vehicle.

Preferably, the airbag is mounted either underneath, above, or in the middle of the dashboard of the motor vehicle. The airbag may be installed in the driver's side of the motor vehicle.

According to another embodiment of the invention, an airbag module with airbag and gas generator, more particularly passenger airbag is provided, wherein the airbag has in the expanded position a restricted cross-section that it has at least approximately parallel sides adjoined on each side by enlarged sections so that the airbag is bone-shaped in the deflated state and in the inflated state. One of the enlarged sections of the airbag faces the occupant.

An airbag of this kind has the advantage that it accurately inflates in a certain direction without an arrangement of arrester straps since it can expand less in the areas with reduced cross-section than in the remaining areas. These restricted cross-sections serve in particular to receive the gas supply and are located in the areas of the airbag which are of secondary importance for the protection function. Through the omission of airbag sections which are not required for the protective function, it is possible to make the volume of the airbag smaller overall.

On the other hand, the airbag has a large volume in the front part facing the occupant which is of great importance for the protective function of the airbag. Furthermore due to this shape, the airbag inflates mainly in the direction of the occupant.

In one embodiment, the at least approximately parallel sides extend over approximately a third of the airbag length and the enlarged sections adjoining each side each extend likewise over about a third of the length. Furthermore it is expedient if an enlarged section of the airbag facing the occupant is larger than the other enlarged section.

In that the airbag has in the inflated state, in plan view, the shape of a bone, a central narrow section and two large-surface end sections are formed. In side view of this embodiment, facing the enlarged ends, a lens, or convex, shape is provided in the inflated state. This shape of the inflated airbag has in addition to the advantages already mentioned the further advantage that an improved support of the occupant's thorax is provided. This lens shape, i.e., the lower expansion of the airbag vertically, is thereby solely reached as a result of the cross-sectional shape of the airbag in the deflated state. Thus, neither an expensive sectional shape nor additional rip seams or arrester straps are required. This, airbag also expands more extensively horizontally than vertically without the need for rip seams.

An additional advantage exists in that the restriction reduces the airbag volume required. Thus a faster filling is possible and a smaller gas generator can be used, i.e., a gas generator with lower mass and smaller structural space.

The airbag preferably consists of two joined together parts having the same shape.

The gas generator should, when using the airbag according to an embodiment of the invention, be mounted below, above, or in the middle of the dashboard so that its main inflation direction runs substantially horizontally in the direction of the occupant.

The gas generator according to an embodiment of the invention is, in the case of a passenger airbag module, advantageously mounted underneath the dashboard so that its main inflation direction runs substantially horizontally in the direction of the occupant. This is furthermore assisted by the use of gathering folds in the airbag and an inflation diffusor. Through this arrangement of an airbag according to an embodiment of the invention, the advantages mentioned above are further intensified. Furthermore, the support of the airbag during inflation and in the inflated state is no longer provided by the windscreen, but rather, the dash board. A large support face is provided by the dashboard and the supporting forces are directed over a large surface into the dashboard. The airbag is thereby safer and can be better positioned and is also to be pressed up with more difficulty by the occupant, that is, it its more difficult for the occupant to bring the inflated airbag out of its natural position, which offers the occupant optimum protection. This better effectiveness of the airbag likewise allows a smaller airbag volume.

The advantages of the bone-shape airbag are also effective with a top and mid mounted installation position.

BRIEF DESCRIPTION OF THE DRAWINGS

The invention will now be described with reference to embodiments shown in the drawings in which:

FIG. 2 show, a cross-section through the airbag illustrated in FIG. 1 along line 2—2;

FIG. 3 shows the airbag of FIG. 1 in the inflated state;

FIG. 4 shows the airbag of FIG. 1 installed in a motor vehicle and in the inflated state;

FIGS. 5 and 6 show an airbag according to another embodiment having a bone-shape without an inflation mouth; and FIG. 7 shows the possible arrangements of the airbag of a passenger airbag module in the dashboard.

Figure 1:
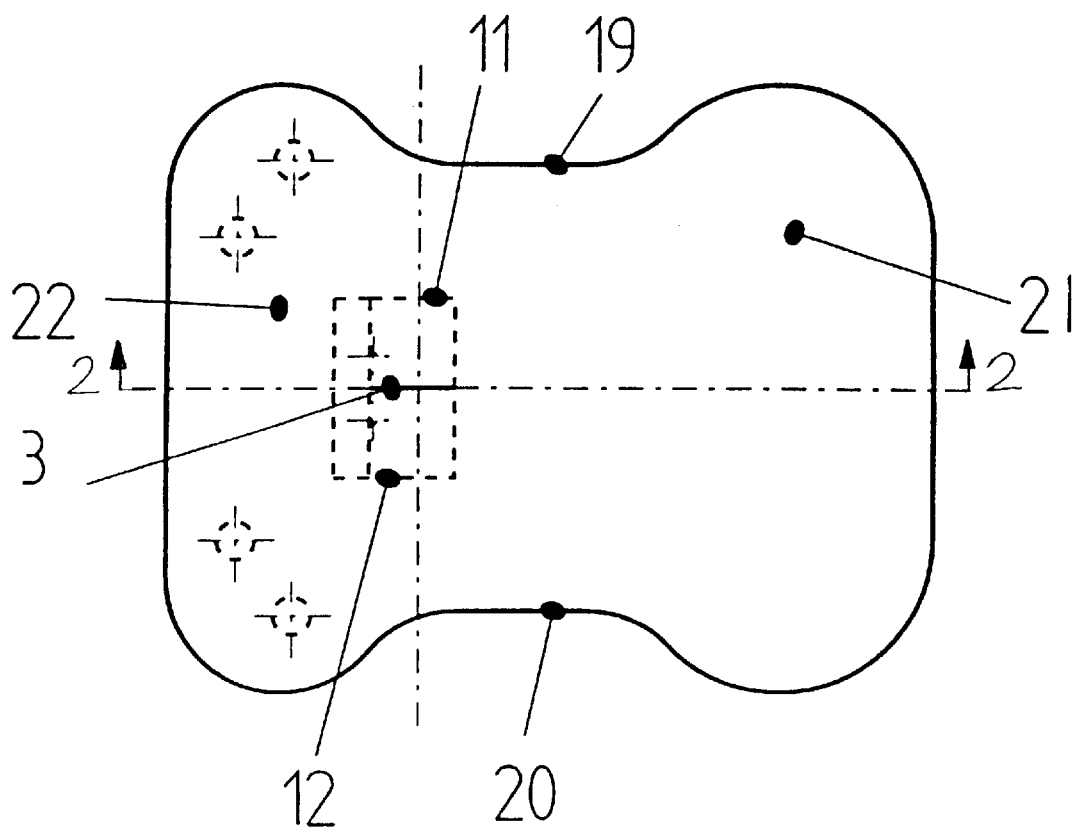
FIG. 1 shows an airbag according to an embodiment of the invention with a restricted cross-section in a middle part in a spread-out, non-inflated state.

In the embodiment illustrated in FIGS. 1 to 3, there is an airbag 10 which comprises an upper part 17 and a lower part 18 of the same external shape, as shown in FIG. 2. These parts have On the middle section parallel sides 19, 20. This section, in which the inflation mouth 3 is provided, is adjoined by sections 21, 22 enlarged on each side so that this airbag is shaped like a bone in its non-inflated state, shown in FIG. 1. The section 21 faces the occupant whilst the section 22 forms the opposite end of the airbag.

FIG. 3 shows this airbag in the inflated state. It is apparent that in plan view it also has in the inflated state a continuous curvature 23 as shown in particular from FIG. 4. Since the airbag also curves down continuously, the airbag has in the inflated state, a lens, or convex, shape in side view.

As shown also from FIG. 4, the airbag 24 in the illustrated attachment underneath the dashboard 14 is inflated mainly in the direction of the occupant and does not come into contact with the windscreen. A support upwards is provided solely by a dashboard 14 of the motor vehicle whereby the airbag 24 is pressed in somewhat through the front section of the dashboard 14. The functional reliability of the airbag is thereby increased further. The airbag 24 is tensioned in the fully inflated state between the occupant and dashboard. It can thereby absorb greater forces and hold its position better in the thorax and abdomen area of the occupant.

With the embodiment of the airbag illustrated in FIGS. 5 and 6, which does not include an inflation mouth, an assembly slit 25 is provided on a lower part 2 of the airbag adjacent the lower plate of the gas generator (not shown). Furthermore assembly openings 26, 27 are provided fork the generator support housing or the gas generator in the lower part 2. Discharge openings 28 are likewise provided in the lower part 2. This bone-shaped airbag is suitable in particular for a top-mounted installation position of the passenger airbag.

FIG. 7 shows three different installation positions for the airbag module according to various embodiments of the invention. One of each installation positions is shown there. There is an airbag module 29 in a top mounted position, an airbag module 30 in the mid-mounted position and an airbag module 31 in the low-mounted position.

The illustrated airbags are shown in the embodiments in connection with passenger airbag modules. These airbags are however also able to be used for other airbags, for example, for passenger airbags in the steering wheel or side airbag.

What is claimed is:

1. A passenger airbag module mounted in a motor vehicle having a passenger position, the airbag module comprising:

a gas generator mounted in the motor vehicle; and an airbag operatively connected to the gas generator and having, in an inflated state, a restricted cross-section with substantially parallel sides that extend in a longitudinal direction and two opposite ends, and two enlarged sections, each adjoining a different one of the two opposite ends of the restricted cross-section such that the airbag is bone-shaped, wherein one of the parallel sides defines a first recess and the other parallel side defines a second recess, wherein the restricted cross-section is without internal tethering between the parallel sides, wherein the airbag is mounted in the motor vehicle such that in the inflated state one of the enlarged sections extends mainly in the longitudinal direction toward the passenger position.

2. The airbag module of claim 1 wherein the airbag has a length in the longitudinal direction, wherein the at least approximately parallel sides of the restricted cross-section extend approximately over a third of the airbag length.

3. The airbag module of claim 1 wherein the airbag consists of two bone-shaped parts having the same peripheral shape that are joined by a common seam along their peripheries to define the bone-shaped airbag, one of the two bone-shaped parts having an inflation mouth that is spaced from the common seam.

4. The airbag module of claim 1, wherein the enlarged section on each of the opposite ends of the restricted cross-section gradually enlarges in the longitudinal direction with diverging sides extending from the parallel sides, each of the parallel sides being nonparallel with its respective diverging side on each of the opposite ends.

5. The airbag module of claim 1, wherein the substantially parallel sides face away from the passenger position when the airbag is in the inflated state.

6. The airbag module of claim 1, wherein the longitudinal direction is aligned with the longitudinal direction of the motor vehicle.

7. A motor vehicle comprising:

a dashboard assembly in front of the vehicle, comprising a dashboard, mounted in the motor vehicle; and a passenger airbag module comprising, a gas generator having a main inflation direction, the gas generator being mounted in the dashboard assembly such that the main inflation direction is substantially horizontal and towards a passenger position of such motor vehicle, and an airbag operatively connected to the gas generator and having, in an inflated state, a restricted cross-section with substantially parallel sides that extend in a longitudinal direction and two opposite ends, and two enlarged sections, each adjoining a different one of the two opposite ends of the restricted cross-section such that the airbag is bone-shaped, wherein one of the parallel sides defines a first recess and the other parallel side defines a second recess, wherein the restricted cross-section is without internal tethering between the parallel sides, wherein one enlarged section of the airbag is adapted to face the passenger position of such motor vehicle and the other enlarged section is adapted to face away from the passenger position of such motor vehicle, wherein the airbag is mounted in the motor vehicle such that in the inflated state the one enlarged section extends mainly in the longitudinal direction toward the passenger position.

8. The airbag system of claim 7, wherein the gas generator is mounted underneath the dashboard.

9. The airbag system of claim 7, wherein the gas generator is mounted in a middle portion of the dashboard.

10. The airbag system of claim 7, wherein the gas generator is mounted above the dashboard.

11. The motor vehicle of claim 7 wherein the airbag has a length in the longitudinal direction, wherein the at least approximately parallel sides of the restricted cross-section extend approximately over a third of the airbag length.

12. The motor vehicle of claim 7, wherein the airbag consists of two bone-shaped parts having the same peripheral shape that are joined by a common seam along their peripheries to define the bone-shaped airbag, one of the two bone-shaped parts having an inflation mouth that is spaced from the common seam.

13. The motor vehicle of claim 7, wherein the enlarged section on each of the opposite ends of the restricted cross-section gradually enlarges in the longitudinal direction with diverging sides extending from the parallel sides, each of the parallel sides being nonparallel with its respective diverging side on each of the opposite ends.

14. The motor vehicle of claim 7, wherein the substantially parallel sides face away from the passenger position when the airbag is in the inflated state.

15. The airbag module of claim 7, wherein the longitudinal direction is aligned with the longitudinal direction of the motor vehicle.

* * * * *